(12) United States Patent
Aoki et al.

(10) Patent No.: US 12,019,886 B2
(45) Date of Patent: Jun. 25, 2024

(54) STORAGE MANAGEMENT APPARATUS, STORAGE MANAGEMENT METHOD, AND PROGRAM

(71) Applicant: SONY INTERACTIVE ENTERTAINMENT INC., Tokyo (JP)

(72) Inventors: Keiichi Aoki, Tokyo (JP); Masaki Takahashi, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 4 days.

(21) Appl. No.: 17/632,675

(22) PCT Filed: Aug. 18, 2020

(86) PCT No.: PCT/JP2020/031102
§ 371 (c)(1),
(2) Date: Feb. 3, 2022

(87) PCT Pub. No.: WO2021/033681
PCT Pub. Date: Feb. 25, 2021

(65) Prior Publication Data
US 2022/0283705 A1    Sep. 8, 2022

(30) Foreign Application Priority Data

Aug. 20, 2019  (JP) .................... 2019-150402

(51) Int. Cl.
*G06F 3/06* (2006.01)
*G06F 12/02* (2006.01)

(52) U.S. Cl.
CPC ............ *G06F 3/064* (2013.01); *G06F 3/0626* (2013.01); *G06F 3/0644* (2013.01);
(Continued)

(58) Field of Classification Search
CPC ...... G06F 3/064; G06F 3/0625; G06F 3/0644; G06F 3/0665; G06F 3/0679; G06F 12/0253
See application file for complete search history.

(56) References Cited

U.S. PATENT DOCUMENTS 10,635,128 B1 *  4/2020  Guo .................... G06F 1/04
11,061,814 B1 *  7/2021  O'Brien, III .......... G06F 3/0616
(Continued)

FOREIGN PATENT DOCUMENTS

JP    2014-186466 A   10/2014
JP    2015-001908 A    1/2015
(Continued)

OTHER PUBLICATIONS

International Search Report and Written Opinion mailed Nov. 24, 2020, from PCT/JP2020/031102, 11 sheets.

*Primary Examiner* — Nanci N Wong
(74) *Attorney, Agent, or Firm* — XSENSUS LLP

(57) ABSTRACT

A decrease in responsiveness when storing content in a flash memory is reduced. A storage management apparatus includes a flash memory including a plurality of blocks that include a plurality of usable blocks and one or more spare blocks. The apparatus is configured to acquire a new data set; change at least a part of the one or more spare blocks into a usable block and store the new data set in the thus changed usable block, in a case where a size of the new data set is larger than the writable area of the plurality of usable blocks and where the size of the new data set is larger than the writable area when an unnecessary data set contained in the plurality of usable blocks is deleted; and change the usable blocks all the data sets of which are deleted into spare blocks through garbage collection.

8 Claims, 7 Drawing Sheets

(52) U.S. Cl.
CPC ........ *G06F 3/0665* (2013.01); *G06F 12/0253* (2013.01); *G06F 3/0679* (2013.01)

(56) References Cited

U.S. PATENT DOCUMENTS

| | | | |
|---|---|---|---|
| 2010/0064043 A1* | 3/2010 | Iino | G06F 9/5077 709/226 |
| 2012/0102289 A1* | 4/2012 | Maram | G06F 3/0628 711/170 |
| 2013/0067138 A1 | 3/2013 | Schuette et al. | |
| 2016/0328179 A1* | 11/2016 | Quinn | G06F 12/0246 |
| 2017/0024137 A1* | 1/2017 | Kanno | G06F 3/0679 |
| 2018/0088805 A1* | 3/2018 | Kanno | G06F 3/065 |
| 2018/0129448 A1* | 5/2018 | Duzly | G06F 3/0616 |

FOREIGN PATENT DOCUMENTS

| | | |
|---|---|---|
| JP | 2017-027387 A | 2/2017 |
| JP | 2017-162067 A | 9/2017 |
| WO | 2014/203315 A1 | 12/2014 |
| WO | WO-2014203315 A1 * 12/2014 | ......... G06F 12/0246 |

\* cited by examiner

STORAGE MANAGEMENT APPARATUS, STORAGE MANAGEMENT METHOD, AND PROGRAM

TECHNICAL FIELD

The present invention relates to a storage management apparatus, a storage management method, and a program.

BACKGROUND ART

A flash memory is used as a storage apparatus for computers such as game machines. The flash memory stores downloaded programs, content, and the like.

SUMMARY

Technical Problem

A flash memory has a plurality of blocks that each has a certain size. Data is written into each block. Due to the characteristics of the flash memory, it is difficult to rewrite only a portion of the data stored in the block. For this reason, in a case where only a portion of the data in the block becomes unnecessary, garbage collection in which only necessary data is copied into another block is performed and then the whole of the original block is erased (released).

Such garbage collection needs transfer of a large amount of data, leading to a heavy processing load, which sometimes causes a problem of hindering other processing such as downloading of data.

The present invention has been made in view of the abovementioned problem, and is aimed at providing a technology to reduce a decrease in responsiveness in storing content in a flash memory.

Solution to Problem

In order to solve the abovementioned problem, a storage management apparatus according to the present invention includes a flash memory including a plurality of blocks that include a plurality of usable blocks and one or a plurality of spare blocks; area detection means for detecting a size of a writable area of the plurality of usable blocks, on the basis of a data set stored in the plurality of usable blocks; acquisition means for acquiring a new data set; data-set writing means for changing, into a usable block, at least a part of the one or the plurality of spare blocks and for storing the new data set in the changed usable block, in a case where a size of the new data set is larger than the writable area of the plurality of usable blocks and where the size of the new data set is larger than the writable area when an unnecessary data set contained in the plurality of usable blocks is deleted; block releasing means for copying, in any of one or a plurality of usable blocks that contain the unnecessary data set, a non-unnecessary data set into another block, and for deleting all data sets contained in the any of the one or the plurality of usable blocks; and block changing means for changing a usable block into a spare block, all the data sets contained in the usable block being deleted.

Moreover, a method of managing a storage according to the present invention, the storage including a flash memory including a plurality of blocks that include a plurality of usable blocks and one or a plurality of spare blocks, includes the steps of detecting a size of a writable area of the plurality of usable blocks, on the basis of a data set stored in the plurality of usable blocks; acquiring a new data set; changing at least a part of the one or the plurality of spare blocks into a usable block and storing the new data set in the changed usable block, in a case where a size of the new data set is larger than the writable area of the plurality of usable blocks and where the size of the new data set is larger than the writable area when an unnecessary data set contained in the plurality of usable blocks is deleted; copying, in any of one or a plurality of usable blocks that contain the unnecessary data set, a non-unnecessary data set into another block and deleting all data sets contained in the any of the one or the plurality of usable blocks; and changing a usable block into a spare block, all the data sets contained in the usable block being deleted.

Further, a program according to the present invention for causing a computer to function as, in a flash memory including a plurality of blocks that include a plurality of usable blocks and one or a plurality of spare blocks, area detection means for detecting a size of a writable area of the plurality of usable blocks, on the basis of a data set stored in the plurality of usable blocks; acquisition means for acquiring a new data set; data-set writing means for changing, into a usable block, at least a part of the one or the plurality of spare blocks and for storing the new data set in the changed usable block, in a case where a size of the new data set is larger than the writable area of the plurality of usable blocks and where the size of the new data set is larger than the writable area when an unnecessary data set contained in the plurality of usable blocks is deleted; block releasing means for copying, in any of one or a plurality of usable blocks that contain the unnecessary data set, a non-unnecessary data set into another block, and for deleting all data sets contained in the any of the one or the plurality of usable blocks; and block changing means for changing a usable block into a spare block, all the data sets contained in the usable block being deleted.

According to the present invention, it is possible to reduce responsiveness in storing content in a flash memory.

In one aspect of the present invention, the storage management apparatus may further include error output means for outputting an error for a user in a case where the size of the new data set is smaller than the writable area when the unnecessary data set contained in the plurality of usable blocks is deleted.

In one aspect of the present invention, the storage management apparatus may further include free-space output means for detecting the writable area when the unnecessary data set contained in the plurality of usable blocks is deleted, the writable area being available for the size of the new data set, and for outputting the detected writable area as a free space.

In one aspect of the present invention, the block changing means may change the usable block into a spare block, all the data sets contained in the usable block being deleted, such that the number of the spare blocks equals a predetermined number.

In one aspect of the present invention, the storage management apparatus may further include storage changing means for changing, on the basis of an operation by a user, the one or the plurality of spare blocks into a usable block in which no data set is stored.

In one aspect of the present invention, the storage management apparatus may further include storage changing means for changing, on the basis of a change of an archive stored in the plurality of usable blocks, the one or the plurality of spare blocks into a usable block in which no data set is stored.

DESCRIPTION OF EMBODIMENT

Hereinafter, an embodiment of the present invention will be described with reference to the appended drawings. In the descriptions, constituent elements having the same functions are designated by the same reference signs, and their explanations will be omitted.

In the present embodiment, a description will be made regarding an information processing apparatus that stores archives, as data sets, in a flash memory. The archives are, for example, ones that have application programs and ones that have image-audio content to be used in the application programs. The information processing apparatus may receive the archives via a network and store the thus received archives in the flash memory. Alternatively, the information processing apparatus may read the archives stored in an information storage medium such as a Blu-ray (registered trademark) optical disk, and store the thus read archives in the flash memory.

Figure 1:
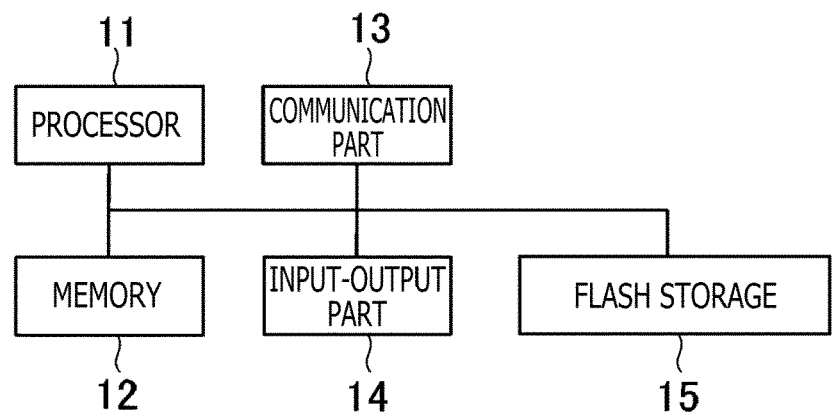
FIG. 1 depicts a diagram illustrating one example of a hardware configuration of an information processing apparatus according to an embodiment of the present invention.

FIG. 1 depicts a diagram illustrating one example of a hardware configuration of the information processing apparatus according to the embodiment of the present invention. The information processing apparatus is, for example, a game machine. The information processing apparatus includes a processor 11, a memory 12, a communication part 13, an input-output part 14, and a flash storage 15.

The processor 11 operates according to programs stored in the memory 12 and thereby controls the communication part 13, the input-output part 14, the flash storage 15, etc. Note that the programs may be provided by being stored in an external computer-readable storage medium or, alternatively, provided via a network such as the Internet.

The memory 12 includes, for example, a volatile memory element such as a dynamic random access memory (DRAM). The memory 12 stores the programs to be executed that are among the abovementioned programs. Further, the memory 12 stores arithmetic results and information which is fed from the processor 11, the communication part 13, and the like. Note that the information processing apparatus includes, besides the memory 12, an external storage apparatus that includes the flash storage 15, and stores programs and information in the external storage apparatus. Note that the information processing apparatus may further include, as an external storage apparatus, at least one of an optical disk apparatus and a hard disk.

The communication part 13 is configured with integrated circuits, connectors, an antenna, and the like that constitute a wired local area network (LAN) and a wireless LAN. The communication part 13 has the function of communicating with other apparatuses via a network. Under the control by the processor 11, the communication part 13 inputs information received from other apparatuses into the processor 11 and the memory 12, and transmits information to the other apparatuses.

The input-output part 14 includes a circuit for receiving input from hardware that detects operations by a user, a display control circuit for outputting the display signals of images to a display, a circuit for controlling the external storage apparatuses such as an optical disk drive, and a circuit for outputting voices and the like.

The input-output part 14 acquires input signals fed from input devices such as a keyboard and a controller, and inputs, into the processor 11 and the memory 12, the information obtained as a result of conversion of the input signals.

The flash storage 15 includes a flash memory element and a controller of the flash memory element.

Figure 2:
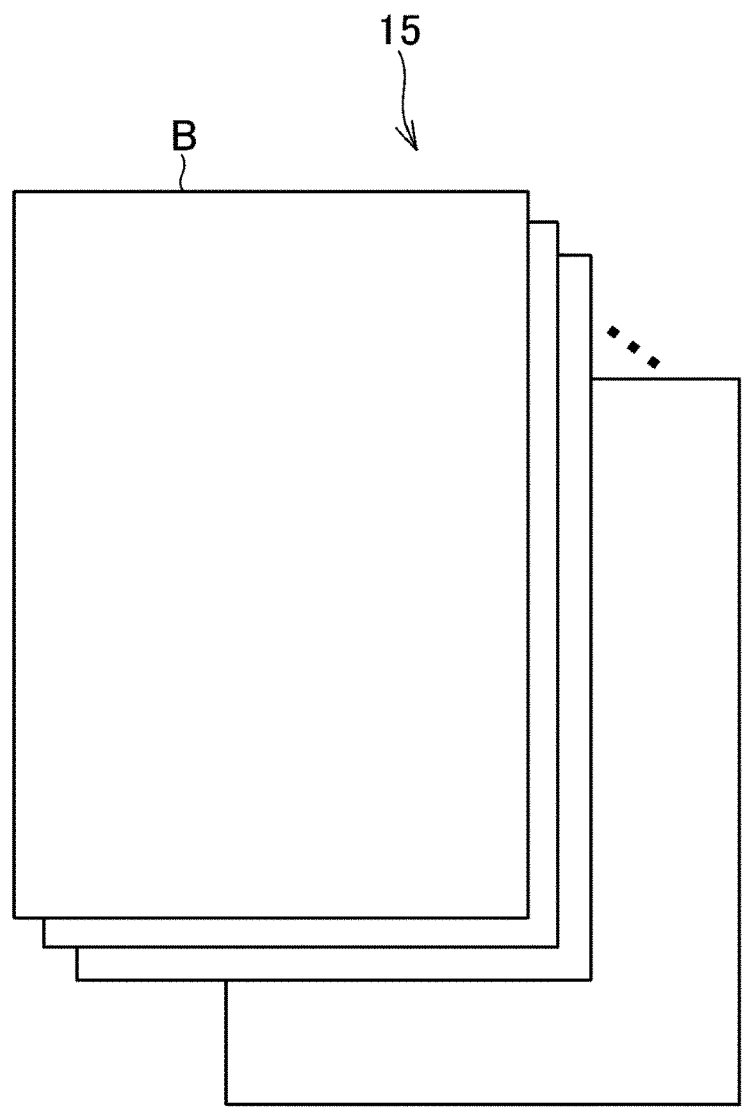
FIG. 2 depicts a diagram illustrating a configuration of a storage area of a flash storage.

FIG. 2 depicts a diagram illustrating a configuration of a storage area of the flash storage 15. The storage area of the flash storage 15 is divided into a plurality of blocks B. The storage area of each block B ranges, for example, from several hundred MB to several GB. Under the control by the processor 11 that is executing an operating system, the flash storage 15 sequentially writes data sets into each block B. Further, it is difficult to simply overwrite the data set recorded in each block B. Instead, the following process is allowed: After all the data stored in the block B including the data set is once deleted, a new data set is newly stored in the block B. Note that each of the blocks B included in the flash storage 15 contains a plurality of pages. On the hardware, writing of a data set in the flash memory element is performed on a unit of page basis. Thus, from the viewpoint of the program running on the operating system, the data set is divided into one or a plurality of writing units according to the sizes of the pages. Then, the one or the plurality of writing units thus divided are sequentially written into the storage area of the block B.

Figure 6:
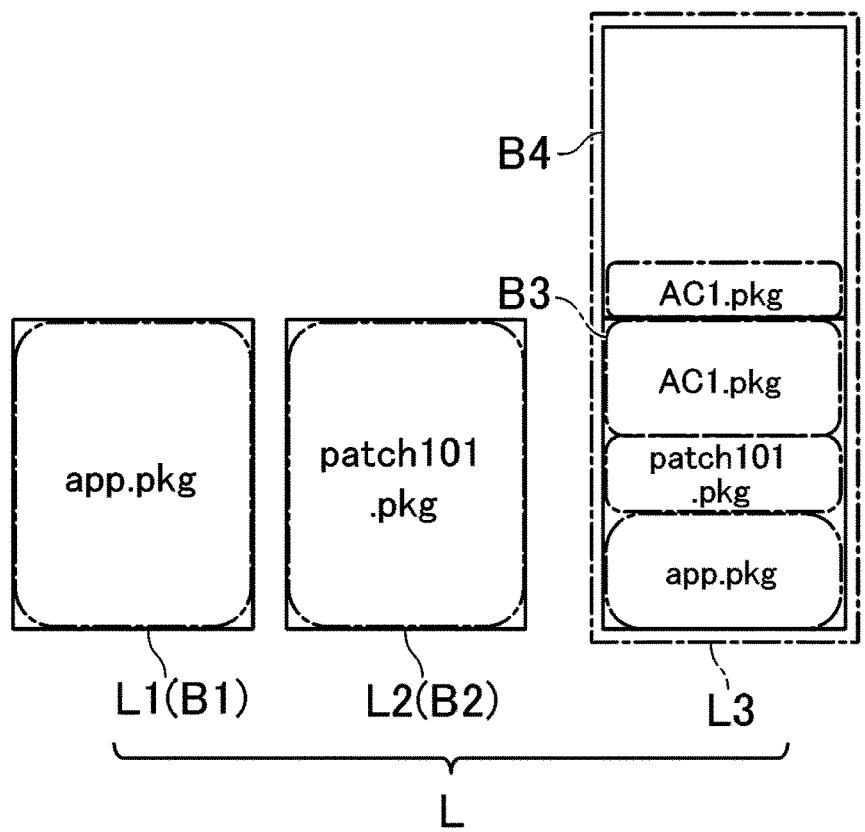
FIG. 6 depicts a diagram illustrating one example of archives stored in a logical partition.

In the present embodiment, one or a plurality of blocks B are assigned to a logical partition L (see FIG. 6). The information processing apparatus writes data sets sequentially into each of the logical partitions L, and erases data in each of the blocks B that constitute the logical partition L. Writing data sets in the logical partition L means that the data sets are written into any one of the blocks B that constitute that logical partition L.

Figure 3:
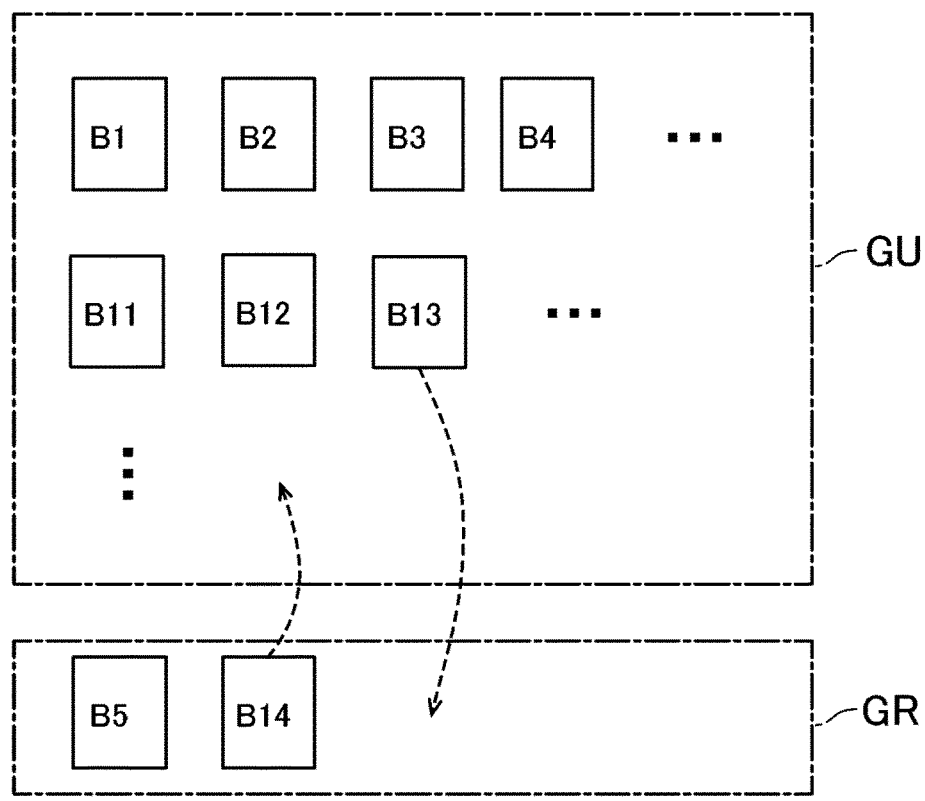
FIG. 3 depicts a diagram for explaining classifications of blocks.

FIG. 3 depicts a diagram for explaining classifications of the blocks B. The plurality of blocks B included in the flash storage 15 are classified into either a usable block group GU or a spare block group GR, according to their attributes. Hereinafter, the blocks B (in the example of FIG. 3, blocks B1 to B4, and B11 to B13) belonging to the usable block group GU are described as the usable blocks, and the blocks B (in the example of FIG. 3, blocks B5 and B14) belonging to the spare block group GR are described as the spare blocks. The usable block is a block B in which a data set can be stored, and the spare block is a block B in which storing a data set is prohibited.

The number of the spare blocks belonging to the spare block group GR is generally constant. The information processing apparatus controls the plurality of blocks B such that the number of the spare blocks becomes as equal to a spare number as possible. For example, a ratio of the spare number to the number of the blocks B of the flash storage 15 in whole may be constant (e.g., 10%). Moreover, the attributes of blocks B may be changed such that the blocks B belonging to the usable block group GU come to belong to the spare block group GR, and the attributes of blocks B may be changed such that the blocks B belonging to the spare block group GR come to belong to the usable block group GU. In other words, in order to make the number of the spare blocks equal to the spare number, spare blocks may be changed into usable blocks, and usable blocks may be changed into spare blocks.

Figure 4:
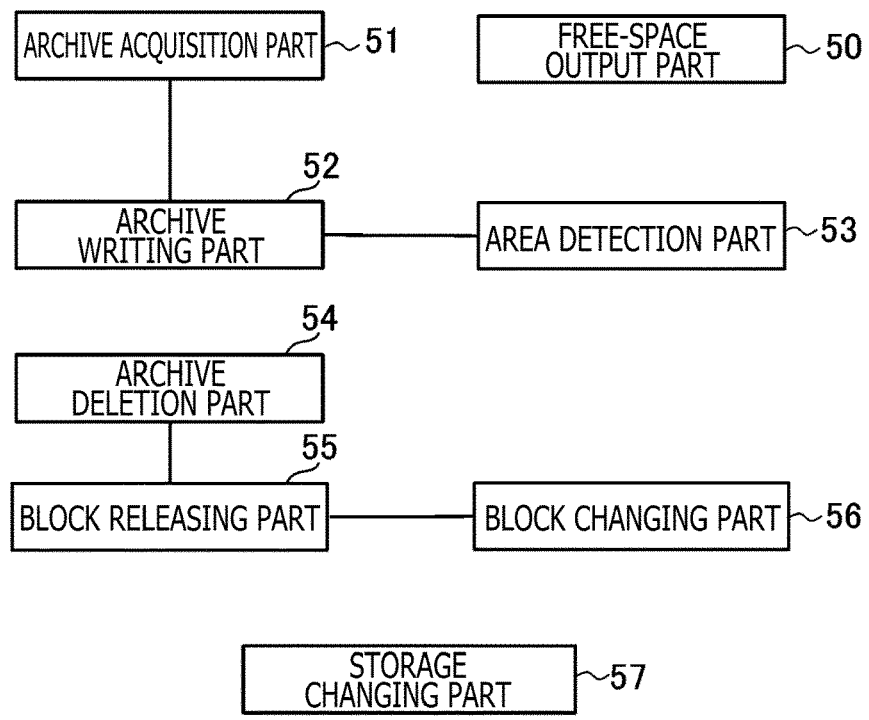
FIG. 4 depicts a block diagram illustrating functions that are implemented by the information processing apparatus.

Next, descriptions will be made regarding the functions and processing implemented by the information processing apparatus. FIG. 4 depicts a block diagram illustrating the functions implemented by the information processing apparatus. The information processing apparatus functionally includes a free-space output part 50, an archive acquisition part 51, an archive writing part 52, an area detection part 53, an archive deletion part 54, a block releasing part 55, a block changing part 56, and a storage changing part 57. The functions are implemented mainly by the processor 11 executing the programs stored in the memory 12 and controlling the communication part 13, the input-output part 14, and the flash storage 15.

The archive acquisition part 51 acquires archive acquisition instructions given by a user, and then acquires a new archive, as a data set, that is instructed by the acquisition instructions. Such an archive belongs to any one of a plurality of predetermined types. The types of archives are three, i.e., "package," "modification package," and "additional content," for example. The package includes an application program and data of content such as images to be output by the program. The modification package is an archive for upgrading the package. The additional content (AC) contains data of additional content available for use by the application program.

In acquiring a new archive, the archive acquisition part 51 may receive an archive instructed via a network from a distribution server or, alternatively, may read an archive that has been instructed and recorded in an external storage medium such as an optical disk. Details of the processing executed by the archive acquisition part 51 will be described later.

The archive writing part 52 stores the new archive that has been acquired by the archive acquisition part 51, in one or a plurality of the usable blocks.

The archive deletion part 54 sets, as an unnecessary data set, the archive that is stored in the flash storage 15 and instructed for deletion by the user, on the basis of deletion instructions given by the user. Here, the archive deletion part 54 stores, in the flash storage 15, a deletion flag for the archive that has been instructed for deletion by the user, thereby setting the archive as the unnecessary data set.

The block releasing part 55 releases the area, in the flash storage 15, that has been made unnecessary by deleting its archive and is not data-writable, through what is generally called garbage collection, and thereby reserves a writable area into which no data is written.

In the garbage collection, the block releasing part 55 transfers (specifically, copies) non-unnecessary data sets from the block B that contains unnecessary data sets to another block B, followed by deleting all of the data sets that are contained in the block B of the copy source. The block B of the transfer source stores the archives that are logically deleted archives but occupy the storage area in the block B, that is, stores the archives which have deletion flags indicating that the archives have been deleted. Details of the garbage collection will be described later.

The area detection part 53 acquires the size of writable areas of a plurality of usable blocks, on the basis of a plurality of blocks B, in particular, on the basis of the data sets stored in the plurality of usable blocks. More specifically, the area detection part 53 acquires the size of writable areas that are among the storage areas of all of the usable blocks in the flash storage 15, that have not stored any data (including unnecessary data sets as well), and that are capable of storing an additional data set.

Here, the archive acquisition part 51 acquires a new archive even in the following case: A case in which the size of the new archive is larger than the size of the writable areas of the plurality of usable blocks and in which the size of the new archive is larger than the size of the writable areas of the plurality of usable blocks when the unnecessary data sets contained in the plurality of usable blocks are deleted. In this case, the archive writing part 52 changes one or at least a part of the spare block into a usable block, and stores at least a part of the new archive in the thus changed usable blocks.

The block changing part 56 changes, into spare blocks, usable blocks all the data sets of which have been deleted by the block releasing part 55, on the basis of the number of the spare blocks in the flash storage 15.

On the basis of the operation by a user or a change in the amount of the data sets stored in the plurality of blocks B, the storage changing part 57 changes one or a plurality of spare blocks into usable blocks in which no data set is stored. Moreover, the storage changing part 57 reduces the spare number, i.e., the number of the spare blocks when the garbage collection is ended.

The free-space output part 50 calculates the size of writable areas in the case where unnecessary data sets contained in the usable blocks in the flash storage 15 are assumed to have been deleted, and outputs the calculated size as a free space. Hereinafter, the writable area in the case described above is described as the free area. The free area includes, in the flash storage 15, not only the writable area at this point in time but also the area occupied by unnecessary data sets which have been deleted logically but not physically.

Figure 5:
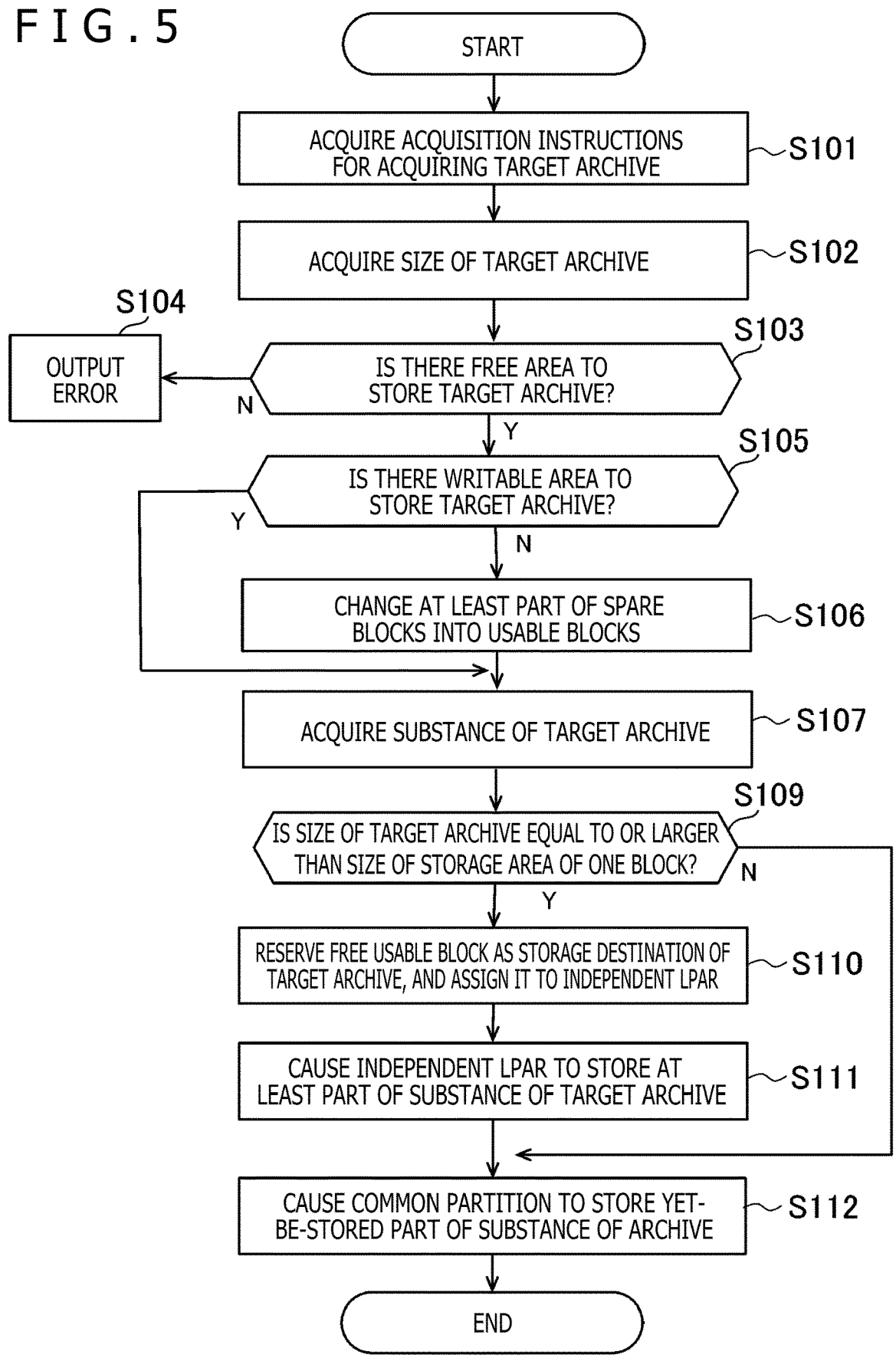
FIG. 5 depicts a flowchart illustrating one example of processing in which the information processing apparatus acquires an archive from the outside and stores it in a flash memory.

Next, a more detailed description is made regarding the processing of acquiring an archive and storing it in the flash storage 15. FIG. 5 depicts a flowchart illustrating one example of the processing in which the information processing apparatus acquires an archive from the outside and stores it in the flash storage 15.

First, the archive acquisition part 51 acquires, from a user, acquisition instructions for acquiring a target archive via, for example, the input-output part 14 (Step S101). Such acquisition instructions are information by which the target archive is specified from among a plurality of archives present in a server, for example, the specified archive which is to be newly acquired by the information processing apparatus and to be stored in the flash storage 15. The acquisition instructions may be information by which a target archive is specified from one or a plurality of archives stored in an external storage medium such as an optical disk, for example, the specified archive which is to be newly acquired by the information processing apparatus and to be stored in the flash storage 15. Moreover, the acquisition instructions may be used to specify a plurality of target archives.

Upon acquiring the acquisition instructions, the archive acquisition part 51 acquires the size of the target archive (Step S102). The size of the archive indicates the size of an occupation area of the archive in the case of being stored in the flash storage 15. In addition, the archive acquisition part 51 may acquire the attributes of other archives (types of archives and the like).

Upon acquiring the size of the target archive, the archive acquisition part 51 determines whether or not there is a free area capable of storing the target archive in the flash storage 15 (Step S103). In the case where there is no free area (N of Step S103), an error is output, and the processing ends (Step S104).

On the other hand, in the case where there is a free space available for storing the target archive (Y of Step S103), the archive acquisition part 51 determines whether or not there is a writable area capable of storing the archive of the object in the flash storage 15 (Step S105). In the case where there is no writable area (N of Step S105), the archive writing part 52 changes, into usable blocks, at least a part of the spare blocks (Step S106). The archive writing part 52 determines the number of spare blocks to be changed according to the insufficient writable area, and changes the thus determined number of the spare blocks into usable blocks. In the case where there is a sufficient writable area (Y of Step S105), the processing skips Step S106.

In Step S107, the archive acquisition part 51 acquires the substance of the target archive (Step S107). Here, the archive acquisition part 51 may receive the substance of the archive via the communication part 13 in the case where the target archive is present on a server, and may read the substance of the archive via the input-output part 14 in the case where the target archive is present in an external storage medium. Note that both the acquisition of the archive and the processing to be described later may be performed in parallel with each other.

Upon acquiring the substance of the archive, the archive writing part 52 determines whether or not the size of the target archive is equal to or larger than the size of the storage area of one block B (Step S109). In the case where the size of the target archive is equal to or larger than the size of the storage area of the one block B (Y of Step S109), the archive writing part 52 reserves usable blocks as a storage destination of the target archive, and then assigns the thus reserved usable blocks to an independent logical partition L (LPAR) (Step S110). Moreover, the archive writing part 52 stores at least a part of the substance of the target archive in the independent logical partition L (Step S111). With this configuration, at least a part of the target archive is stored in the block B in which no other archive is stored. On the other hand, in the case where the size of the target archive is smaller than the size of the storage area of the one block B (N of Step S109), the processing skips Steps S110 and S111.

Upon storing a part of the substance of the archive in the independent logical partition L, the archive writing part 52 stores a yet-to-be-stored part of the substance of the archive in a usable block that constitutes a common partition (Step S112). Note that, in the case where there is no yet-to-be-stored part of the substance of the archive, the archive writing part 52 does not store the substance of the archive in the common partition. Here, in the case where the writable area of the usable block that constitutes the common partition is larger than the yet-to-be-stored part, the archive writing part 52 additionally assigns a new usable block to the common partition, and stores the substance of the archive also in the added usable block.

Through the processing from Step S109 to Step S112, in the case where the size of the target archive exceeds the size of the block B, the archive writing part 52 performs the following three steps of processing. In the first processing, the archive writing part 52 divides the target archive into a plurality of portions. In the second processing, the archive writing part 52 stores at least a part of the plurality of portions in one or a plurality of blocks B in which no other archive is stored. In the third processing, the archive writing part 52 stores, of the plurality of portions, portions that have not been stored in the one or the plurality of blocks B, in which case these portions are stored in a block B in the common partition where other archives are stored as well. Moreover, the size of the archive stored in the block B of the common partition is smaller than the size of the block B.

The common partition is a logical partition L to which one or a plurality of blocks B are assigned. The common partition stores data of a plurality of archives regardless of their types of applications. Data of a plurality of archives is stored also in each of the blocks B that constitute the common partition.

FIG. 6 depicts a diagram illustrating one example of archives stored in a logical partitions L. FIG. 6 depicts an example in which archives app.pkg, patch101.pkg, and AC1.pkg are acquired in this order, and are then stored in the flash storage 15. Logical partitions L1 and L2 respectively have blocks B1 and B2. A logical partition L3 is a common partition. Blocks B3 and B4 are assigned to the logical partition L3. Moreover, a part of the package (app.pkg) and a part of the modification package (patch101.pkg) are stored in the independent logical partitions L1 and L2, respectively. Further, the logical partition L3 stores the archive AC1.pkg and parts of the archives app.pkg and patch101.pkg which are parts that have not been stored in the logical partitions L1 and L2.

In the case where the size of the new archive acquired by the archive acquisition part 51 is larger than the writable area of a plurality of usable blocks and where the size of the new data set is larger than the writable area when unnecessary data sets contained in the plurality of usable blocks are deleted, spare blocks are changed into usable blocks (Step S106). In this case, it is inevitable that at least a part of the new archive will be stored in the usable block which has been changed from the spare block. Thus, in the case described above, the archive writing part 52 stores at least a part of the new archive in the usable block changed from the spare block.

In the present embodiment, even in the state in which the writable area becomes insufficient, use of the spare blocks makes it possible to store a new archive without performing garbage collection. Although the storage capacity as a whole decreases, the configuration is advantageous even in the case where enough time cannot be allocated for garbage collection due to, for example, the deletion of data sets that is performed immediately before the acquisition of an archive, for example. This configuration allows a reduction in the length of time required for acquiring the archive.

Next, a description is made regarding deletion of an archive by the archive deletion part 54. The archive deletion part 54 receives, from a user, instructions (deletion instructions) for deleting any of the archives stored in the flash storage 15 via, for example, the input-output part 14. Then, for the thus instructed archive, the archive deletion part 54 sets a deletion flag in the block B that stores the indicated archive, thereby causing the indicated archive to become unusable. The reason why the substance of the indicated archive is not deleted from the flash storage 15 is that the deletion needs to be performed on a per unit of block B basis and it is thus impossible to delete only the substance of the instructed archive. Note that, in the absence of other archives undeleted in the block B that stores the instructed archive, the archive deletion part 54 deletes the block B so as to make it a free block B.

Figure 7:
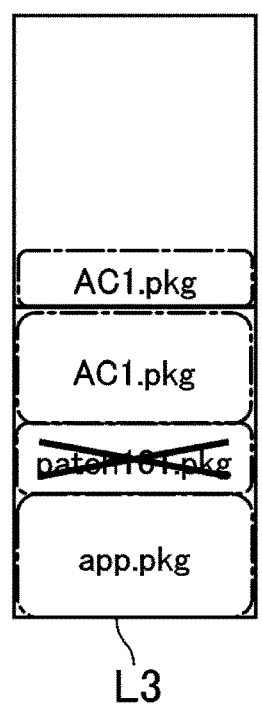
FIG. 7 depicts a diagram for explaining deletion of an archive.

FIG. 7 depicts a diagram for explaining the deletion of an archive. The case depicted in FIG. 7 is one in which the modification package patch101.pkg depicted in FIG. 6 is deleted. In this case, both the logical partition L2 that stores only the substance of the modification package patch101.pkg and the block B2 that constitutes the logical partition L2 are deleted. In addition, the substance of the modification package patch101.pkg stored in the logical partition L3 becomes unusable.

Figure 8:
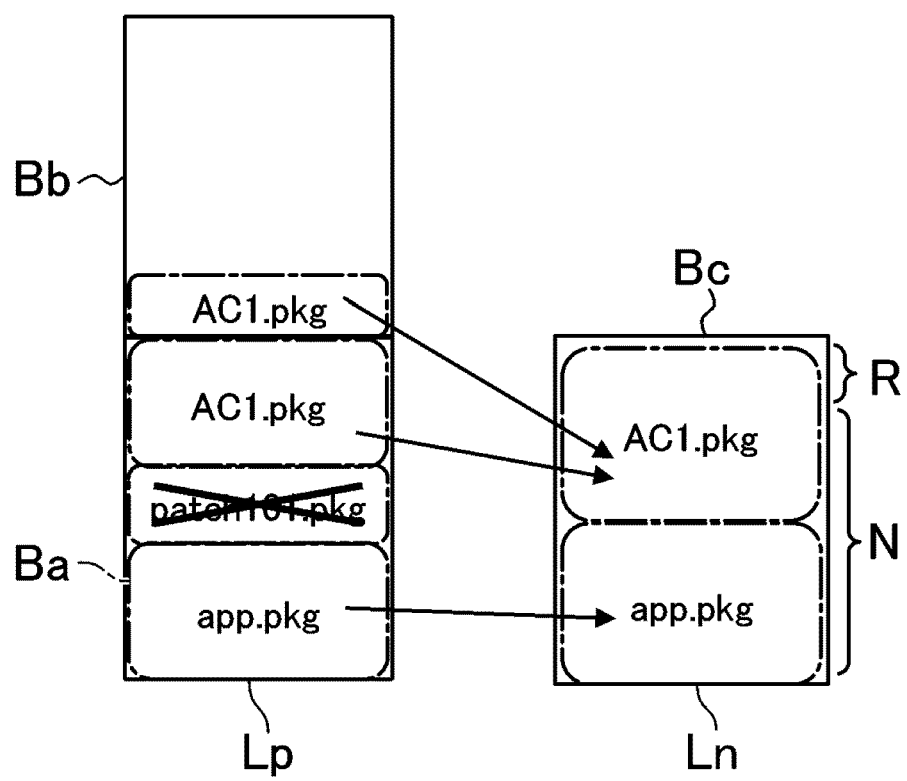
FIG. 8 depicts a diagram for explaining a method of garbage collection.

Next, a description is made regarding garbage collection performed by the block releasing part 55. FIG. 8 depicts a diagram for explaining a method of garbage collection. In the example of FIG. 8, the original logical partition Lp includes two blocks Ba and Bb. The logical partition Ln that has undergone the garbage collection includes one block Bc, and stores the archives that are stored in the logical partition Lp and have not been deleted. In the present embodiment, the garbage collection is processing in which the block releasing part 55 copies the archives stored in a plurality of blocks B (Ba and Bb in FIG. 8), stores them in a smaller number of blocks B (Bc in FIG. 8), and then releases the blocks B (Ba and Bb in FIG. 8) of the copy source. This processing makes the released blocks B assignable to another logical partition L, decreases the unusable area, and increases the actual writable area.

Figure 9:
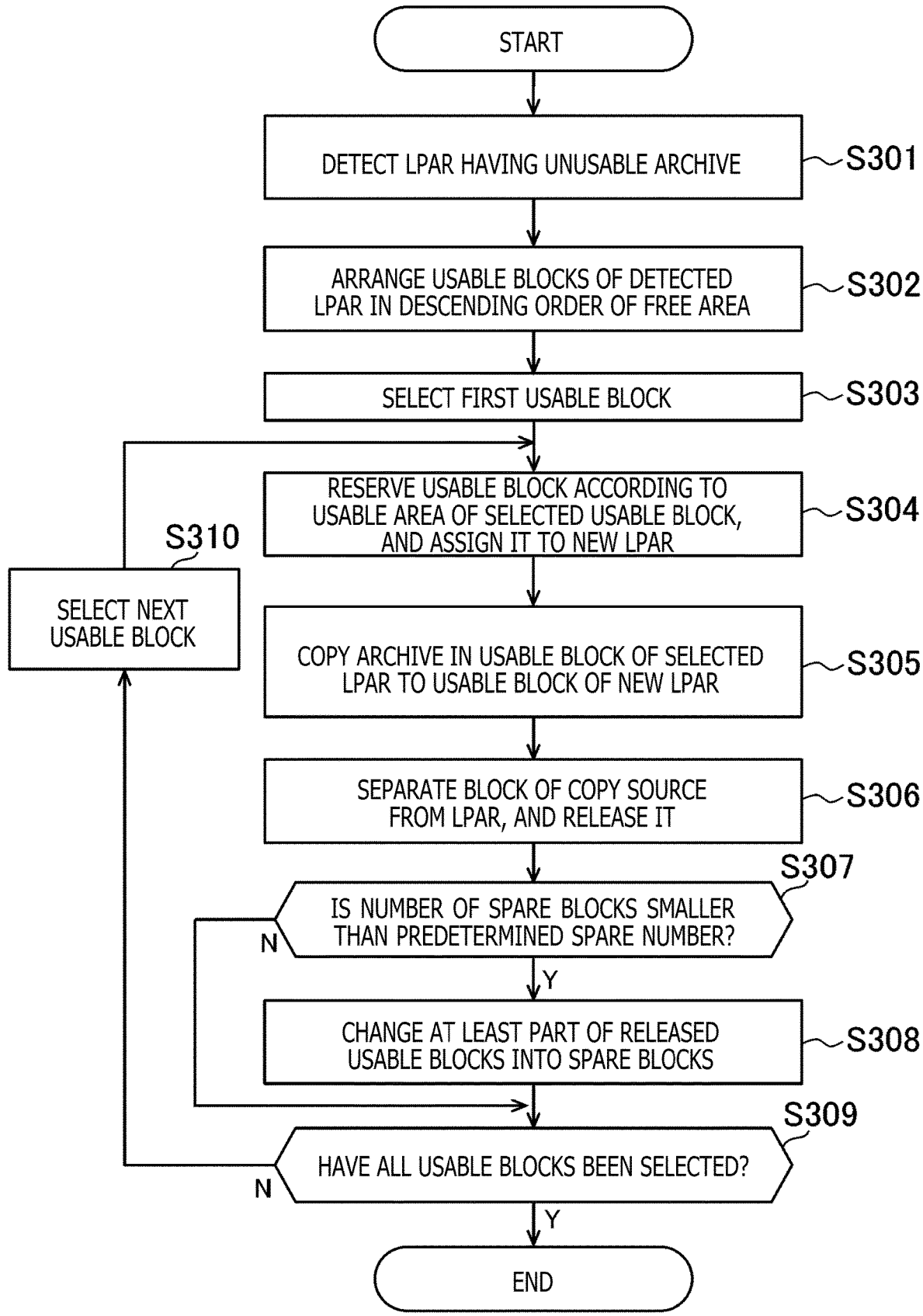
FIG. 9 depicts a flowchart illustrating one example of processing of the garbage collection.

FIG. 9 depicts a flowchart illustrating one example of the processing of the garbage collection. First, the block releasing part 55 detects the logical partition L that contains an unusable archive (Step S301).

The block releasing part 55 arranges usable blocks of the thus detected logical partition L in descending order of free area (Step S302), and then selects a first usable block (Step S303). The block releasing part 55 copies the archives in the selected logical partition L into a usable block of a new logical partition L (Step S304), separates the usable block of the copy source from the logical partition L, thereby releasing the usable block (Step S305). Then, when the number of the spare blocks in the flash storage 15 is smaller than a predetermined spare number (Y of Step S307), at least a part of the thus released usable blocks are changed into spare blocks (Step S308). The number of the usable blocks to be changed into spare blocks is equal to or smaller than the difference between the predetermined spare number and the current number of the spare blocks. When the number of the spare blocks in the flash storage 15 is equal to or larger than the predetermined spare number, the processing skips Step S308. Then, when all of the usable blocks are yet to be selected (N of Step S309), the block releasing part 55 selects the next usable block (Step S310), and repeats Step S304 and subsequent steps.

Here, use of the spare blocks allows quick storing of archives even in the presence of unnecessary archives. However, since no data is stored in the spare blocks, the total capacity of the flash storage 15 appears to be reduced from the viewpoint of the user. For a user who does not worry about the length of time required for acquisition of a new data set, it may be desirable that no spare block be arranged or the spare blocks be reduced in number. Hereinafter, for addressing this subject, the processing performed by the storage changing part 57 will be described.

Figure 10:
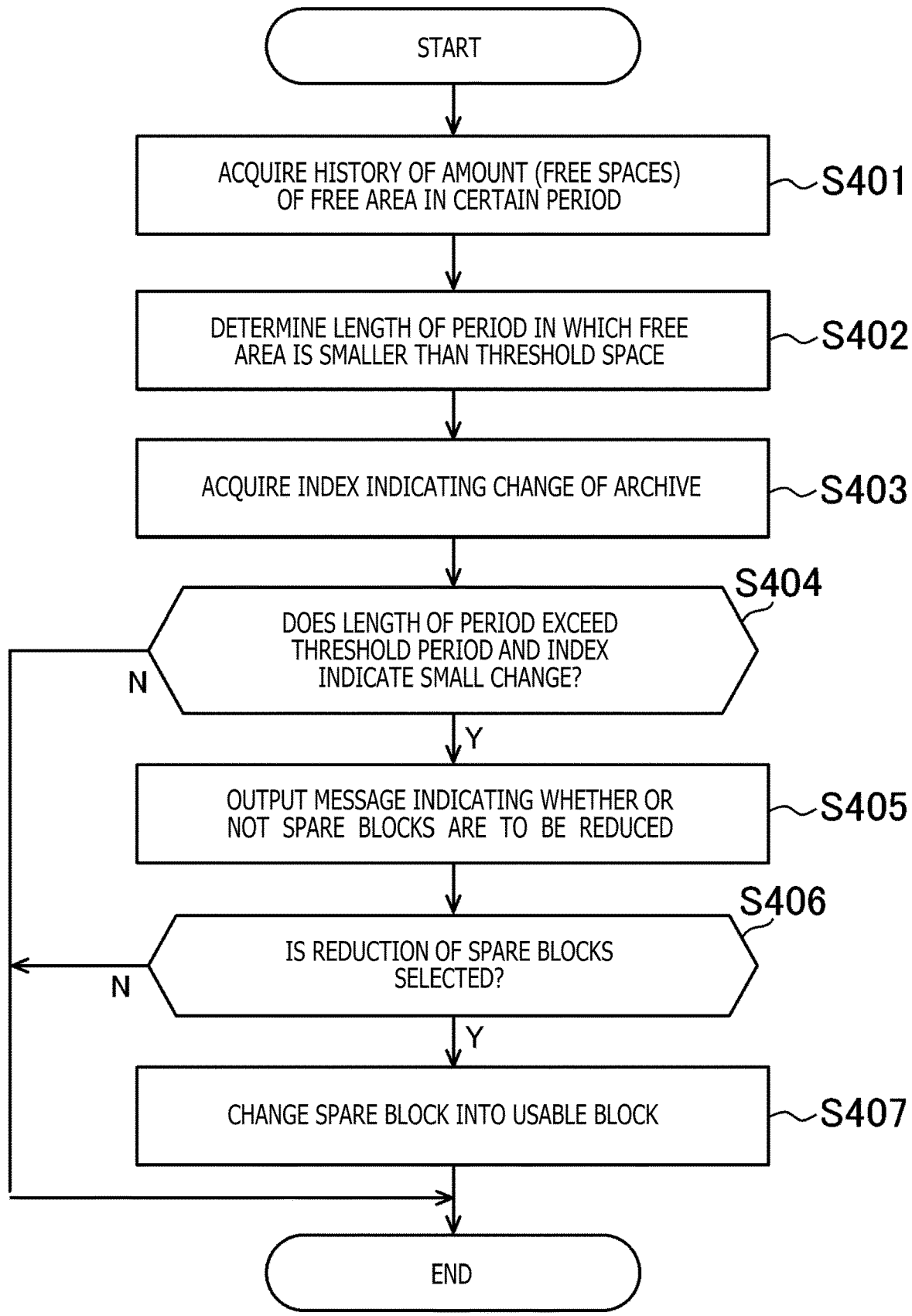
FIG. 10 depicts a flowchart illustrating one example of processing performed by a storage changing part.

FIG. 10 depicts a flowchart illustrating one example of the processing performed by the storage changing part 57. The processing depicted in FIG. 10 may be performed with a certain period (e.g., every week). For the processing performed by the storage changing part 57, the information processing apparatus monitors the change in the amount (free space) of the free area, and stores the history of the free space in the memory 12.

First, the storage changing part 57 acquires the history of the free space in a certain period (e.g., one week or one month) (Step S401). Next, the storage changing part 57 determines, on the basis of the acquired history, the length of period during which the free area is smaller than a threshold space (Step S402). Further, the storage changing part 57 acquires an index that indicates the change of archives (Step S403). Such an index indicating the change of archives may be a frequency with which the archive acquisition part 51 acquires an archive or, alternatively, a frequency with which an archive is deleted.

Upon acquiring the length of period and the index, the storage changing part 57 determines whether or not the length of period exceeds a threshold period and whether or not the acquired index indicates a small change (Step S404). The description that the acquired index indicates a small change may mean, for example, that the frequency of either acquiring or deleting an archive is smaller than a threshold value for determination.

In the case where the length of period exceeds the threshold period and where the acquired index indicates a small change (Step S404), there is a high probability that the number of times for the user to feel difficulty in acquiring an archive is small. Thus, the storage changing part 57 causes an output device to output a message indicating whether or not the spare blocks are to be reduced (Step S405). Then, the storage changing part 57 acquires a selection operation by a user that is performed in response to the message. In the case where the selection operation selects a reduction of the spare blocks (Y of Step S406), the storage changing part 57 reduces the spare blocks of each of the plurality of blocks B (Step S407).

Note that the processing from Step S401 to Step S405 may be omitted and the processing of Step S407 may only be performed in the case where the user simply performs an operation to support a reduction of the spare blocks on the setting screen. Further, the storage changing part 57 may automatically optimize the number of the spare blocks without performing the processing of Steps S405 and S406. In addition, the storage changing part 57 may measure the communication speed of the information processing apparatus, and reduce the spare blocks in the case where the measured communication speed is not equal to or larger than a threshold value.

The processing performed by the storage changing part 57 allows the optimization between the ensuring of the speed of acquiring data sets and the reserving of spaces, according to the user's situation.

The invention claimed is:

1. A method of managing a storage including a flash memory including a plurality of blocks that include a plurality of usable blocks and one or a plurality of spare blocks, the method comprising:

detecting a size of a writable area of the plurality of usable blocks, on a basis of a data set stored in the plurality of usable blocks;

acquiring a new data set;

changing at least a part of the one or the plurality of spare blocks into a usable block and storing the new data set in the changed usable block, in a case where a size of the new data set is larger than the writable area of the plurality of usable blocks and where the size of the new data set is larger than the writable area when a garbage data set contained in the plurality of usable blocks is deleted;

copying, in any of one or a plurality of usable blocks that contain the garbage data set, a non-garbage data set into another block and deleting all data sets contained in the any of the one or the plurality of usable blocks; and changing a usable block into a spare block, all the data sets contained in the usable block being deleted, wherein storing a data set is prohibited in the spare block.

2. A non-transitory computer readable medium having stored thereon a program for a computer, in a flash memory including a plurality of blocks that include a plurality of usable blocks and one or a plurality of spare blocks, the program comprising:

detecting a size of a writable area of the plurality of usable blocks, on a basis of a data set stored in the plurality of usable blocks;

acquiring a new data set;

changing, into a usable block, at least a part of the one or the plurality of spare blocks and storing the new data set in the changed usable block, in a case where a size of the new data set is larger than the writable area of the plurality of usable blocks and where the size of the new data set is larger than the writable area when a garbage data set contained in the plurality of usable blocks is deleted;

copying, in any of one or a plurality of usable blocks that contain the garbage data set, a non-garbage data set into another block, and deleting all data sets contained in the any of the one or the plurality of usable blocks; and changing a usable block into a spare block, all the data sets contained in the usable block being deleted, wherein storing a data set is prohibited in the spare block.

3. A storage management apparatus comprising:

a flash memory including a plurality of blocks that include a plurality of usable blocks and one or a plurality of spare blocks; and processing circuitry configured to detect a size of a writable area of the plurality of usable blocks, on a basis of a data set stored in the plurality of usable blocks;

acquire a new data set;

change, into a usable block, at least a part of the one or the plurality of spare blocks and for storing the new data set in the changed usable block, in a case where a size of the new data set is larger than the writable area of the plurality of usable blocks and where the size of the new data set is larger than the writable area when a garbage data set contained in the plurality of usable blocks is deleted;

copy, in any of one or a plurality of usable blocks that contain the garbage data set, a non-garbage data set into another block, and for deleting all data sets contained in the any of the one or the plurality of usable blocks; and change a usable block into a spare block, all the data sets contained in the usable block being deleted, wherein storing a data set is prohibited in the spare block.

4. The storage management apparatus according to claim 3, wherein the processing circuitry is further configured to:
output an error for a user in a case where the size of the new data set is smaller than the writable area when the garbage data set contained in the plurality of usable blocks is deleted.

5. The storage management apparatus according to claim 3, wherein the processing circuitry is further configured to:
detect a size of the writable area when the garbage data set contained in the plurality of usable blocks is deleted, the writable area being available for the new data set and to output the detected size.

6. The storage management apparatus according to claim 3, wherein the processing circuitry is further configured to change the usable block into a spare block, all the data sets contained in the usable block being deleted, such that the number of the spare blocks equals a predetermined number.

7. The storage management apparatus according to claim 3, wherein the processing circuitry is further configured to:
change, on a basis of an operation by a user, the one or the plurality of spare blocks into a usable block in which no data set is stored.

8. The storage management apparatus according to claim 3, wherein the processing circuitry is further configured to:
change, on a basis of a change of an archive stored in the plurality of usable blocks, the one or the plurality of spare blocks into a usable block in which no data set is stored.

* * * * *